(12) United States Patent
Abu Qahouq et al.

(10) Patent No.: US 7,772,819 B2
(45) Date of Patent: Aug. 10, 2010

(54) SYSTEMS AND METHODS FOR IMPROVED COUPLED INDUCTOR TOPOLOGY EFFICIENCY UTILIZING A LIGHT LOAD SIGNAL

(75) Inventors: Jaber Abu Qahouq, Beaverton, OR (US); Lilly Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 11/904,465

(22) Filed: Sep. 27, 2007

(65) Prior Publication Data

US 2009/0085536 A1    Apr. 2, 2009

(51) Int. Cl.
*G05F 1/40* (2006.01)
*G05F 1/10* (2006.01)

(52) U.S. Cl. ...................... 323/282; 323/222
(58) Field of Classification Search ............... 323/222, 323/223, 225, 268, 271, 272, 282, 349–351; 363/65, 67, 69, 70
See application file for complete search history.

(56) References Cited

U.S. PATENT DOCUMENTS

| 6,091,233 A * | 7/2000 | Hwang et al. ............... 323/222 |
| 6,501,194 B1 * | 12/2002 | Jiang et al. .................... 307/66 |
| 7,518,895 B2 * | 4/2009 | Shekhawat et al. ........... 363/89 |

* cited by examiner

*Primary Examiner*—Matthew V Nguyen
(74) *Attorney, Agent, or Firm*—Schubert Osterrieder & Nickelson PLLC; Jeffrey Schubert

(57) ABSTRACT

Embodiments include systems and methods for voltage regulation in a coupled inductor topology. Embodiments comprise a switching voltage regulator that is responsive to a light load signal from the device to which power is supplied. When the light load signal indicates that the device is not in a light load condition, the voltage regulator exhibits a low resistance to reduce $I^2R$ losses. When the light load signal indicates that the device is in a light load condition, the voltage regulator exhibits a higher resistance but lower capacitive losses within. In some embodiments, a first set of switches enables an inductor to charge through switches of the first set and a second set of switches enables the inductor to discharge through switches of the second set. The number of switches and their associated drivers in a set that are placed in a continuously-off state depends upon whether the device is in a light load condition or not.

15 Claims, 4 Drawing Sheets

SYSTEMS AND METHODS FOR IMPROVED COUPLED INDUCTOR TOPOLOGY EFFICIENCY UTILIZING A LIGHT LOAD SIGNAL

FIELD

This written description relates to the field of voltage regulation in a power supply. More particularly, the written description relates to voltage regulation in a coupled inductor power supply topology.

BACKGROUND

Many digital machines or devices, such as computers and servers, require accurate and reliable power supplies that do not dissipate large amounts of energy. One type of power supply that has gained interest is the coupled inductor voltage regulator power supply. This configuration comprises at least two parallel branches with an inductor in each branch. The inductors are mutually coupled so that current/voltage in one induces current/voltage in the other. If the coupled inductor is implemented in what is know as "buck" converter topology, for example, two sets of switches are in each branch. The inductor in a branch charges through a first set of switches and discharges through a second set of switches. More switches in a set can be in parallel to exhibit a low resistance to keep $I^2R$ losses low. However, the more switches in parallel, the higher the capacitive losses in the voltage regulator. Capacitive losses can be decreased by having fewer switches in parallel but this would increase $I^2R$ losses.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for voltage regulation in a coupled inductor topology. Embodiments comprise a switching voltage regulator that is responsive to a light load signal from the device to which power is supplied. When the light load signal indicates that the device is not in a light load condition, the voltage regulator exhibits a low resistance to reduce $I^2R$ losses. When the light load signal indicates that the device is in a light load condition, the voltage regulator exhibits a higher resistance but lower capacitive losses within. In some embodiments, a first set of switches enables an inductor to charge through switches of the first set and a second set of switches enables the inductor to discharge through switches of the second set. The number of switches in a set that are placed in a continuously-off state depends upon whether the device is in a light load condition or not. To decrease capacitive losses in a light load condition, more switches are placed in a continuously-off state. This increases resistance, but $I^2R$ losses will still be low because the current I is low. In a heavy load state, fewer switches are placed in a continuously-off state to decrease resistance in order to decrease $I^2R$ losses when the current I is high.

Figure 1:
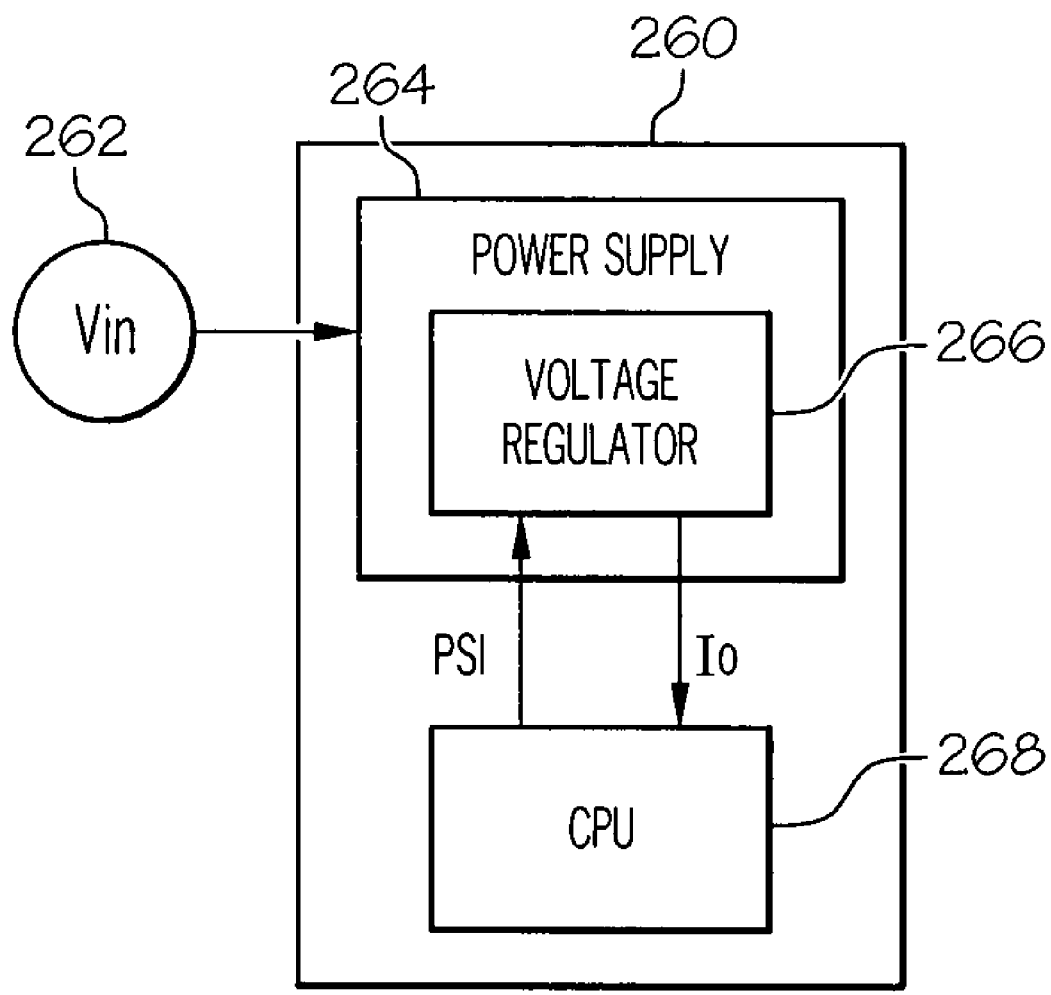
FIG. 1 depicts an embodiment of a system with a power supply responsive to a light load signal from the powered device.

FIG. 1 shows a configuration of a power supply 264 within a computer system 260. Computer system 260 comprises a Central Processing Unit (CPU) 268 which draws current from a voltage regulator 266 of power supply 264. A computer system 260 will, of course, comprise other components such as Read Only Memory (ROM), Random Access Memory (RAM), and interface circuitry to interface with a keyboard, mouse, video monitor, printer, etc.

Power supply 264 receives a voltage Vin, 262. Voltage regulator 266 regulates the voltage received to present a constant DC voltage to CPU 268. Voltage regulator 266 operates in response to a light load signal from CPU 268. A light load signal from CPU 268 indicates to the voltage regulator that CPU 268 is drawing a smaller amount of current from voltage regulator 266. For example, in many CPU, a Power State Indication (PSI) signal is output when the current drawn by the CPU drops below a certain pre-determined threshold. Thus, in a computer system, the PSI signal is used as the light load signal for controlling the voltage regulator.

Voltage regulator 266 responds to the PSI signal from CPU 268 by varying its internal resistance. When current drawn by CPU 268 is high, as indicated by the light load signal, the internal resistance of voltage regulator 266 is lowered to reduce $I^2R$ losses in the power supply. When current drawn by CPU 268 is low, as indicated by the light load signal, the internal resistance of voltage regulator 266 may be high and still have low $I^2R$ losses. As will be discussed below, allowing the internal resistance of the voltage 266 to be high, allows for lower capacitive losses in the voltage regulator. Thus, when the current drawn is high, the resistance presented by the voltage regulator is lowered to reduce resistive losses and when the current drawn is low, capacitive losses presented by the voltage regulator are lowered while allowing R to increase. Increased resistance R is acceptable because the current is low.

Figure 2:
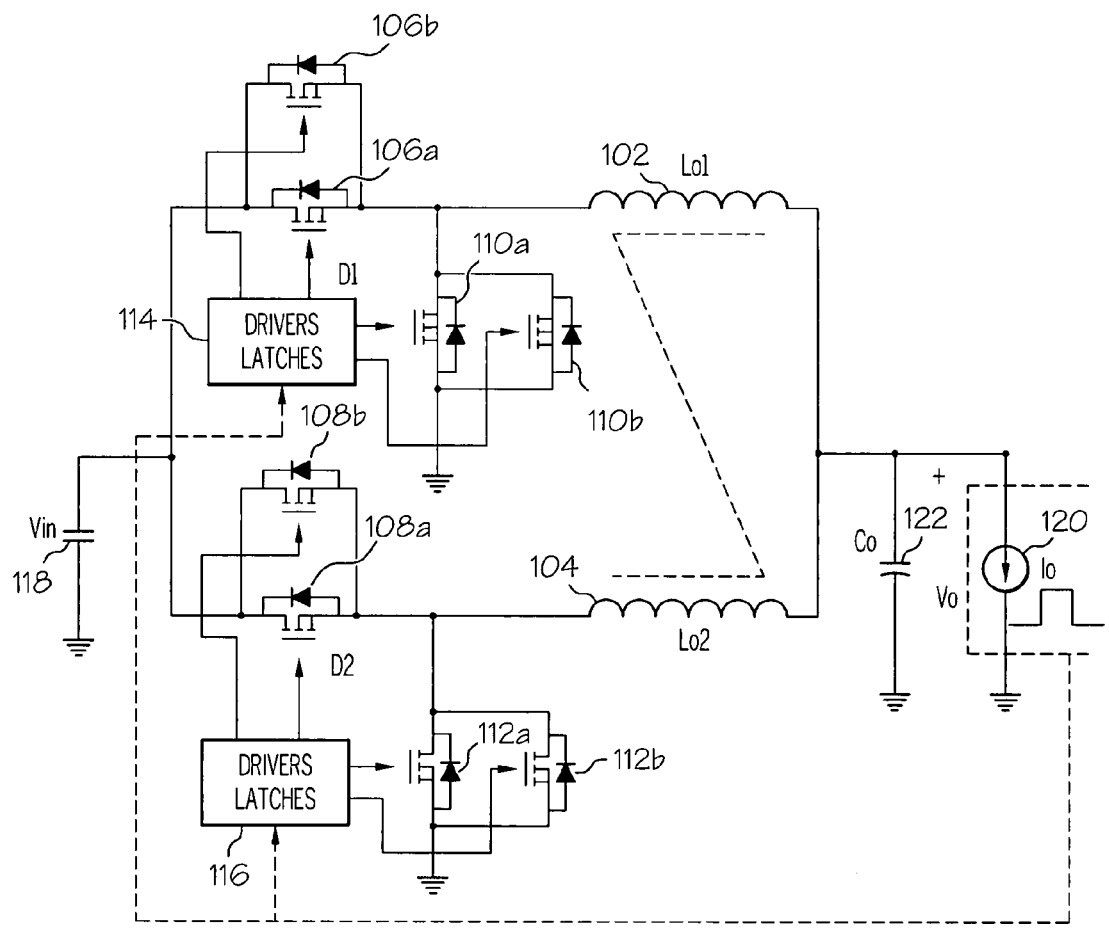
FIG. 2 depicts an embodiment of a voltage regulator responsive to a light load signal from a powered device.

FIG. 2 shows an embodiment for voltage regulation in a coupled inductor topology. The source voltage 118 is supplied to each parallel branch of a multiple branch circuit. FIG. 2 shows only two branches but more branches could be employed. An inductor 102 is in the first branch and an inductor 104 is in the second branch. The inductors are coupled so that energy induced in one inductor induces energy in the other inductor and vice versa. The upper branch comprises a first set of (upper) switches 106a, 106b, and a second set of (lower) switches 110a, 110b. The lower branch comprises a first set of (upper) switches 108a, 108b, and a second set of (lower) switches 112a, 112b. Only two switches in each set are shown, but there could be more, as will be explained subsequently, for example, with reference to FIG. 4.

The inductor in a branch charges through the first set of switches and discharges through the second set of switches. Note that the switches in a set of switches are in parallel. Thus, increasing the number of switches turned on lowers resistance, while increasing the number of switches turned off increases resistance but reduces capacitive losses.

The upper branch comprises drivers 114 and the lower branch comprises drivers 116. Drivers 114 control which switches of the upper branch are on or off. Drivers 116 control which switches of the lower branch are on or off. The switches are turned on or off in order to produce a constant D.C. (direct current) voltage Vo 122 across the device to which power is being supplied. Thus, the configuration of FIG. 2 is designed to produce, as near as possible, an ideal voltage source, Vo, 122. Thus, a constant voltage Vo 122 is presented to the device that draws a variable current Io 120.

Any one or more of the switches within a set may be turned on or off individually by the drivers. The drivers 114, 116 control which switches are on or off in response to a light load signal from the device drawing current 120. Thus, the switches turned on or off depend upon a light load signal from the machine, device, instrument, computer, observer to which power is being provided. A light load signal is a signal indicating that the device originating the signal is in a low power or high power state. For instance, a PSI (Power State Indication) signal from a computer sent to its power supply indicates when the computer is in a low power state.

When a device is in a low power state it does not draw much current Io 120. When the device is in a high power state it draws more current Io 120. When a device does not draw much current because it is in a low power state, $I^2R$ losses in the voltage regulator are low because the current Io is low. This means the resistance presented by the switches can be high and still achieve low $I^2R$ losses. Since the switches in a set are in parallel, an increase in resistance is achieved by turning off some of the switches that are in parallel. Turning more switches off reduces capacitive losses. On the other hand, when the device draws much current because it is in a high power state, $I^2R$ losses in the voltage regulator will be high unless R is low. R is made low by turning on more parallel switches in a set of switches. Thus, in a light load condition, capacitive losses are decreased by turning off more switches. This increases R, but since the current is low, $I^2R$ losses are still relatively low. When not in a light load condition, R is made small by turning on more switches to decrease $I^2R$ losses.

Suppose for example that the device drawing current Io 120 is not in a light load state. That is, it draws significant current. The resistance presented by the switches must be made low to reduce $I^2R$ losses in the voltage regulator. To lower the resistance, more switches are turned on. Thus, in one state, both upper switches 106a, 106b are on and both lower switches 110a, 110b are off. In this state, upper switches 108a, 108b are turned off while lower switches 112a, 112b are turned on. In this state, inductor 102 charges through switches 106, and inductor 104 discharges through switches 112. In an opposite state, both upper switches 106a, 106b are off and both lower switches 110a, 110b are on. In this state, upper switches 108a, 108b are turned on while lower switches 112a, 112b are turned off. In this state, inductor 102 discharges through switches 110, and inductor 104 charges through switches 108.

Suppose now that the device drawing current 120 is in a light load state; that is, the device draws only a small amount of current. In this case, the resistance presented by a set of switches can be increased by turning off one or more switches in a set. Turning off more switches reduces capacitive losses in the voltage regulator. Thus, for example, switches 106a, 108a, 110a, and 112a can all be turned off and kept off during the light load condition of the device drawing current 120. In one state, then, switch 106b is on while switch 110b is off. In this state, switch 108b is off while switch 112b is on. Inductor 102 charges through switch 106b and inductor 104 discharges through switch 112b. In an opposite state, switch 106b is off while switch 110b is on. In this state, switch 108b is on while switch 112b is off. Inductor 102 discharges through switch 110b and inductor 104 charges through switch 108b.

Thus, when the current 120 drawn by a device is high, the resistance presented by the switches should be small. The resistance presented by the switches can be reduced by turning on more of the parallel switches in a set. Conversely, when the current 120 drawn by a device is low, the resistance presented by the switches can be high. This allows more switches to be turned off. Turning off more switches reduces capacitive losses in the voltage regulator. Although FIG. 2 shows only 2 switches per set, there could be more. Similarly, there may be more than two branches. Therefore, one embodiment comprises three switches per set. Any one, two, or three of the switches can be turned on or off in response to a signal from the device drawing current 120. In some embodiments, the number of switches in a set turned on or off depends upon the current 120 drawn by the device. The higher the current drawn by the device, the more switches in a parallel set that will be simultaneously turned on. The lower the current drawn by the device, the fewer switches in a parallel set that will be simultaneously turned on. This is explained with reference to the example of FIG. 4.

Thus, one embodiment is a voltage regulator responsive to a light load signal from a device to which power is supplied by the voltage regulator. The embodiment comprises at least two parallel branches of circuitry. Each branch comprises a first set of switches and a second set of switches to enable an inductor in each branch to charge through the first set of switches and discharge through the second set of switches. A driver in each branch is capable of selecting individual ones of the switches in a set to be turned of or off in response to the light load signal to enable the voltage regulator to exhibit a high resistance when the light load signal is present and to exhibit a low resistance when the light load signal is not present.

In one embodiment the inductors in each branch are mutually coupled with current in one inductor inducing current in the other inductors. A light load signal may be a Power State Indication signal from a central processing unit. In an embodiment, when the voltage regulator exhibits a high resistance, the voltage regulator presents low capacitive losses. In response to the light load signal, at least one switch in each of the first and second set of switches is placed in a continuously-off state.

In one embodiment, in a first state, in a first branch, all switches in the first set of switches except for at least one switch in a continuously-off state are turned on, and all switches in the second set of switches are turned off. In the first state, in a second branch, all switches in the first set of switches are turned off, and all switches in the second set of switches except for at least one switch in a continuously-off state are turned on. In a second state, in the first branch, all switches in the first set of switches are turned off, and all switches in the second set of switches except for at least one switch in a continuously-off state are turned on. In the second state, in a second branch, all switches in the first set of switches are turned off, and all switches in the second set of switches except for at least one switch in a continuously-off state are turned on.

Figure 3:
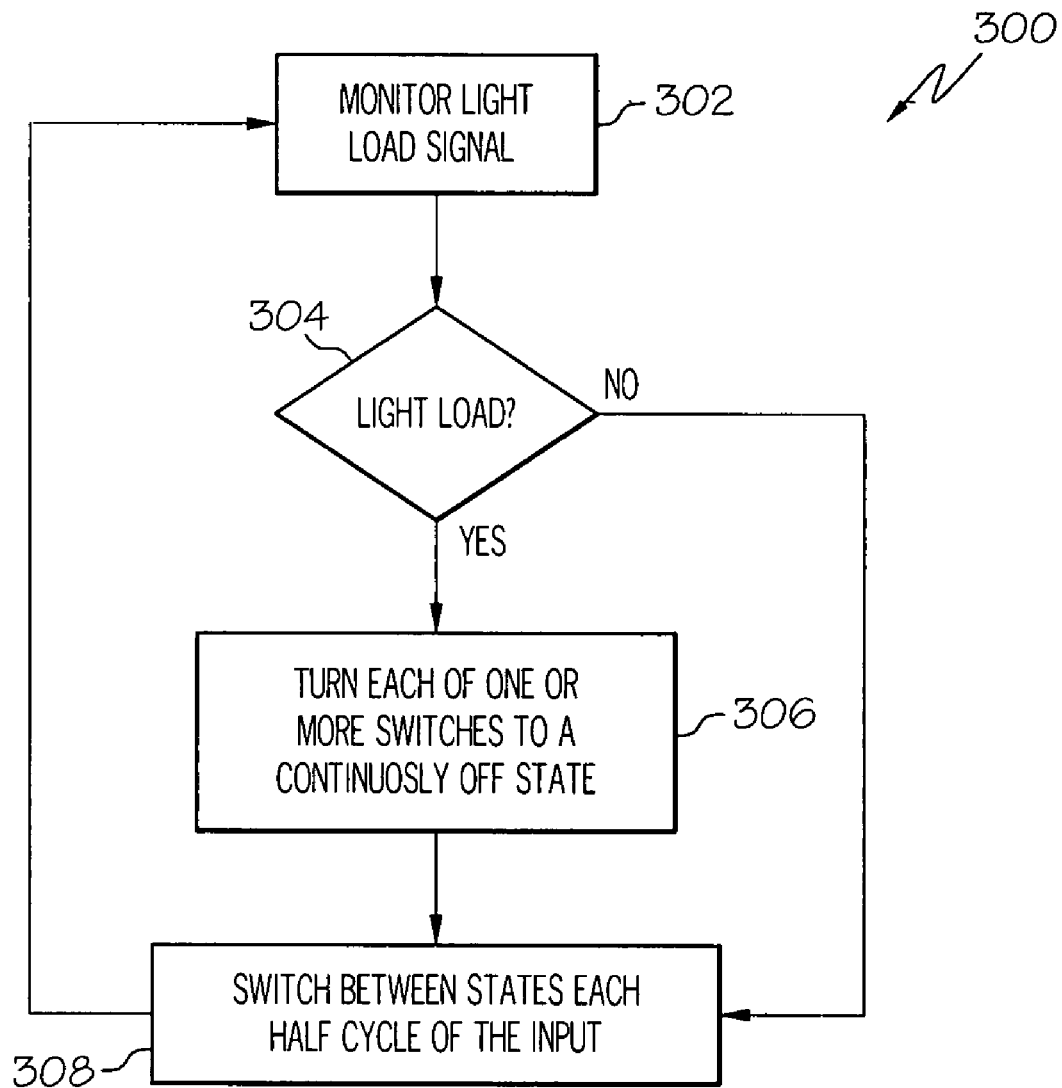
FIG. 3 depicts an embodiment of a flow chart for a voltage regulator responding to a light load signal.

FIG. 3 shows a flow chart 300 of an embodiment for selective switching in a voltage regulator. During operation, the voltage regulator monitors the light load signal from the device to which power is supplied (element 302). If there is a light load (element 304), then the system turns off each of one or more switches, but less than all the switches, in a set to a continuously-off state (element 306). Thus, for example, in one embodiment one switch in each set of upper and lower switches in each branch can be set to a continuously-off state. Then, the system switches between states each half cycle of the input voltage (element 308). If there is no light load (element 304), as determined from the light load signal, the regulator switches between states (element 308) without setting switches to a continuously-off state. Meanwhile, the system continues to monitor the light load signal (element 302).

Thus, some embodiments comprise a method for voltage regulation responsive to a light load signal from a device to which power is supplied by a voltage regulator. The method comprises providing to each of a plurality of parallel branches, an input voltage. In each branch, is a first set of switches and a second set of switches to enable an inductor in a branch to charge through the first set of switches and discharge through the second set of switches. The method further comprises selecting by a driver, individual ones of the switches in a set to be turned on or off in response to the light load signal. This enables the voltage regulator to exhibit a high resistance and low capacitive losses when the light load signal is present and to exhibit a low resistance when the light load signal is not present.

The method may also comprise mutually coupling the inductors in each branch to enable current/voltage in one inductor to induce current/voltage in the other inductors. In response to a light load signal, at least one switch in each of the first and second set of switches is placed in a continuously-off state. In a first state, in a first branch, all switches in the first set of switches except for at least one switch in a continuously-off state are turned on, and all switches in the second set of switches are turned off. In the first state, in a second branch, all switches in the first set are turned off, and all switches in the second set except for at least one switch in a continuously-off state are turned on. In a second state, in the first branch, all of the switches in the first set of switches are turned off, and all the switches in the second set except for at least one continuously-off switch are turned on. In the second state, in the second branch, all the switches in the first set, except for one continuously-off switch are turned on, and all the switches in the second set are turned off. Thus, the regulator switches between the two states every half-cycle.

Figure 4:
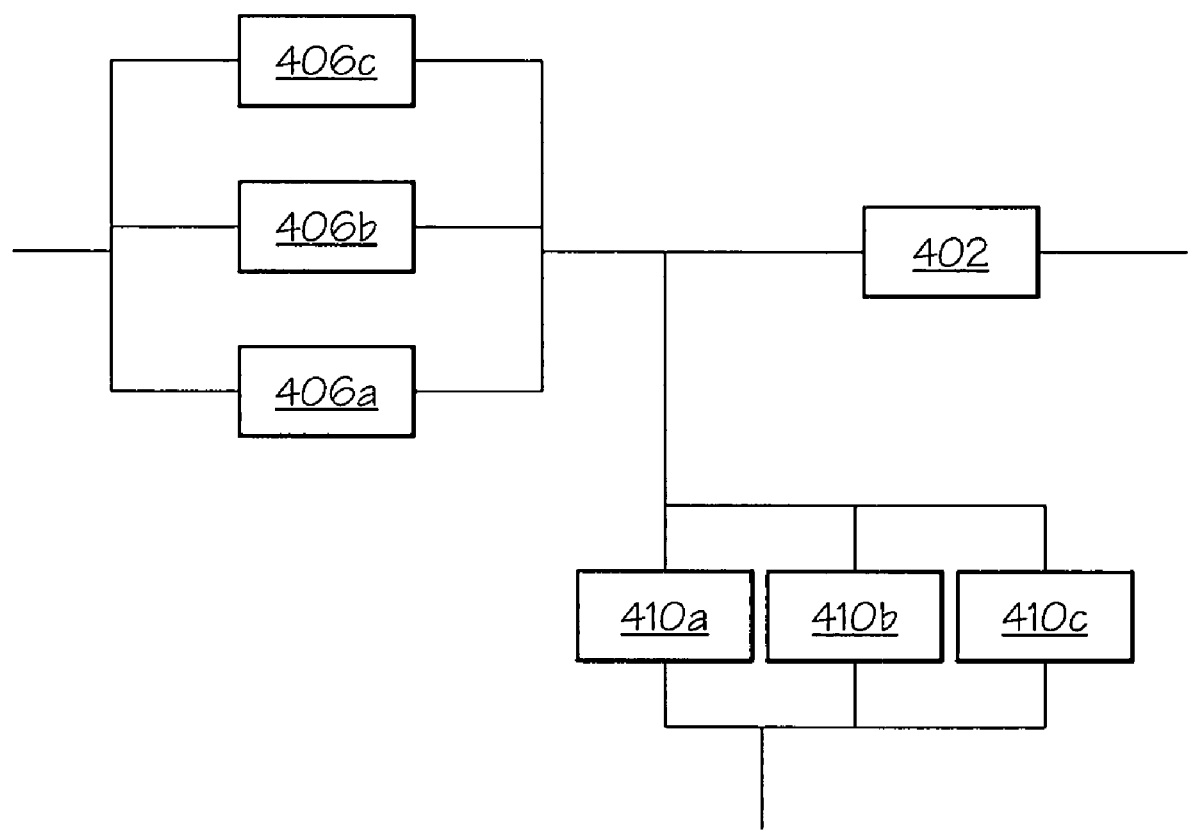
FIG. 4 depicts an embodiment of three switches in each set of switches in a branch for responding to a three-state light load signal.

FIG. 4 shows an embodiment of one branch configuration that can be used for multi-load devices. In this configuration, drivers (not shown) receive a light load signal that can indicate one of three states: light load, intermediate load, and heavy load. The driver can individually select each one of the switches in a first set 406*a, b,* and *c* to be on or off. Similarly, the driver can individually select each one of the switches in the second set 410*a, b* and *c* to be on or off. The switches that are turned continuously-off depend on the light load signal. In a light load condition, two switches in each set are turned continuously-off. In an intermediate load condition, one switch in each set is turned continuously-off. In a heavy load condition, none of the switches are turned continuously-off.

In FIG. 4, an inductor 402 is in series with the first set of switches 406*a, b* and *c*, and is in parallel with the second set of switches 410*a, b* and *c*. Inductor 402 charges through the first set of switches and discharges through the second set of switches. The switches that are not set to a continuously off state will alternate between on and off as the regulator alternates between states every half cycle of the input voltage. Thus, in a heavy load condition, in a first state, all threes switches 406*a, b* and *c* are on while all three switches 410*a, b* and *c* are off. In this state, inductor 402 charges through switches 406*a, b* and *c*. In a second state, all three switches 406*a, b* and *c* are off while all three switches 410*a, b* and *c* are on. In this state, inductor 402 discharges through switches 410*a, b* and *c*.

In an intermediate load condition, switches 406*a* and 4110*a* are placed in a continuously-off state. Then, switches 406*b* and 406*c* alternate between two states: both on and both off. Switches 410*b* and 410*c* alternate between both off and both on. Inductor 402 charges through switches 406*b* and *c* and discharges through switches 410*b* and *c*. In a light load condition, switches 406*a* and *b*, and switches 410*a* and *b*, are all placed in a continuously-off state. Then, switch 406*c* turns on and off, while switch 410*c* turns off and on. Inductor 402 charges through switch 406*c* and discharges through switch 410*c*. Thus, the configuration of FIG. 4 enables the voltage regulator to be responsive to a three-state light load signal.

Thus, any plural number of switches can be placed in each set and one, two or more of the switches can be turned continuously-off. Turning more switches on reduces resistance but increases capacitive losses, whereas turning more switches to a continuously-off state, increases resistance but decreases capacitive losses.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A voltage regulator, comprising:
   at least two parallel branches, each branch comprising a first set of switches and a second set of switches to enable an inductor to charge through the first set of switches and discharge through the second set of switches; and
   a driver coupled with each branch to select less than all of the switches in the first set and less than all of the switches in the second set to be turned on or off in response to the light load signal to enable the voltage regulator to exhibit a high resistance when the light load signal is indicated and to be turned on to exhibit a low resistance when the light load signal is not indicated.

2. The voltage regulator of claim 1, wherein the inductors in each branch are mutually coupled with current in one inductor inducing current in the other inductors.

3. The voltage regulator of claim 1, wherein the light load signal is a Power State Indication signal from a central processing unit.

4. The voltage regulator of claim 1, wherein, when the voltage regulator exhibits a high resistance, the voltage regulator presents low capacitive losses.

5. The voltage regulator of claim 1, wherein, in response to the light load signal, at least one switch in each of the first and second set of switches is placed in a continuously-off state.

6. The voltage regulator of claim 1, wherein in a first state, in a first branch, all switches in the first set of switches except for at least one switch in a continuously-off state are turned on, and all switches in the second set of switches are turned off.

7. The voltage regulator of claim 6, wherein, in the first state, in a second branch, all switches in the first set of switches are turned off, and all switches in the second set of switches except for at least one switch in a continuously-off state are turned on.

8. The voltage regulator of claim 1, wherein in a second state, in the first branch, all switches in the first set of switches are turned off, and all switches in the second set of switches except for at least one switch in a continuously-off state are turned on.

9. The voltage regulator of claim 8, wherein in the second state, in a second branch, all switches in the first set of switches are turned off, and all switches in the second set of switches except for at least one switch in a continuously-off state are turned on.

10. A method for voltage regulation, comprising:
providing to each of a plurality of parallel branches, an input voltage;
in each branch, providing a first set of switches and a second set of switches to enable an inductor in a branch to charge through the first set of switches and discharge through the second set of switches; and
selecting by a driver, less than all of the switches in the first set and less than all of the switches in the second set to be turned off in response to the light load signal to enable the voltage regulator to exhibit a high resistance when the light load signal is indicated and to be turned on to exhibit a low resistance when the light load signal is not indicated.

11. The method of claim 10, further comprising mutually coupling the inductors in each branch to enable current in one inductor to induce current in the other inductors.

12. The method of claim 10, further comprising exhibiting by the voltage regulator low capacitive losses when the voltage regulator exhibits a high resistance.

13. The method of claim 10, wherein, in response to the light load signal, at least one switch in each of the first and second set of switches is placed in a continuously-off state.

14. The method of claim 10, wherein in a first state, in a first branch, all switches in the first set of switches except for at least one switch in a continuously-off state are turned on, and all switches in the second set of switches are turned off.

15. The method of claim 14, wherein, in the first state, in a second branch, all switches in the first set of switches are turned off, and all switches in the second set of switches except for at least one switch in a continuously-off state are turned on.

* * * * *

UNITED STATES PATENT AND TRADEMARK OFFICE
CERTIFICATE OF CORRECTION

PATENT NO. : 7,772,819 B2  
APPLICATION NO. : 11/904465  
DATED : August 10, 2010  
INVENTOR(S) : Jaber Abu Qahouq et al.

Page 1 of 1

It is certified that error appears in the above-identified patent and that said Letters Patent is hereby corrected as shown below:

In column 6, line 54, in claim 1, after "turned" delete "on or".

Signed and Sealed this  
Twenty-second Day of February, 2011

David J. Kappos  
*Director of the United States Patent and Trademark Office*